US012728595B2

(12) United States Patent
Schaede et al.

(10) Patent No.: US 12,728,595 B2
(45) Date of Patent: Sep. 8, 2026

(54) METHOD AND APPARATUS FOR PRODUCING THREE-DIMENSIONAL OBJECTS BY SELECTIVELY SOLIDIFYING A BUILD MATERIAL APPLIED LAYER BY LAYER

(71) Applicant: TRUMPF Laser- und Systemtechnik GmbH, Ditzingen (DE)

(72) Inventors: Florian Schaede, Stuttgart (DE); Lukas Witz, Schramberg (DE); Kai Etzel, Besigheim (DE)

(73) Assignee: TRUMPF LASER- UND SYSTEMTECHNIK GMBH, Ditzingen (DE)

(*) Notice: Subject to any disclaimer, the term of this patent is extended or adjusted under 35 U.S.C. 154(b) by 466 days.

(21) Appl. No.: 18/308,693

(22) Filed: Apr. 28, 2023

(65) Prior Publication Data

US 2023/0256675 A1 Aug. 17, 2023

Related U.S. Application Data

(63) Continuation of application No. PCT/EP2021/080818, filed on Nov. 5, 2021.

(30) Foreign Application Priority Data

Nov. 9, 2020 (DE) ..................... 10 2020 129 413.1

(51) Int. Cl.
*B29C 64/20* (2017.01)
*B22F 12/70* (2021.01)
(Continued)

(52) U.S. Cl.
CPC .............. *B29C 64/20* (2017.08); *B29C 64/25* (2017.08); *B29C 64/268* (2017.08); (Continued)

(58) Field of Classification Search
CPC ..... B29C 64/20; B29C 64/268; B29C 64/364; B29C 64/371; B29C 64/25; B33Y 30/00; B22F 12/70
See application file for complete search history.

(56) References Cited

U.S. PATENT DOCUMENTS 6,583,379 B1 * 6/2003 Meiners .................. B22F 12/70 219/121.65
2009/0266803 A1 10/2009 Perret et al.
(Continued)

FOREIGN PATENT DOCUMENTS

DE 102006014694 B3 10/2007
DE 102014205875 A1 10/2015
(Continued)

*Primary Examiner* — Jerzi H Moreno Hernandez
(74) *Attorney, Agent, or Firm* — LEYDIG, VOIT & MAYER, LTD.

(57) ABSTRACT

An apparatus for producing a three-dimensional object includes a process chamber, a process assistance device including a centre module and an outer module for facilitating a primary gas flow, and a feed device disposed above a build platform for feeding a secondary gas flow through a feed opening of the feed device onto the build platform. The feed device includes two feed channels disposed on either side of a beam inlet opening. The process chamber includes two wall portions opposing each other in an X direction. Each wall portion has a flow surface that extends toward the build platform. The flow surfaces of the two wall portions constrict a cross-sectional area of the process chamber in the X direction. Proceeding from the feed opening of the feed device, a distance between the flow surfaces of the two wall portions in the X direction progressively reduces towards the build platform.

14 Claims, 7 Drawing Sheets

(51) Int. Cl.

| | |
|---|---|
| ***B29C 64/25*** | (2017.01) |
| ***B29C 64/268*** | (2017.01) |
| ***B29C 64/364*** | (2017.01) |
| ***B29C 64/371*** | (2017.01) |
| ***B33Y 30/00*** | (2015.01) |
| *B33Y 10/00* | (2015.01) |

(52) U.S. Cl.

CPC .......... *B29C 64/364* (2017.08); *B29C 64/371* (2017.08); *B22F 12/70* (2021.01); *B33Y 10/00* (2014.12); *B33Y 30/00* (2014.12)

(56) References Cited

U.S. PATENT DOCUMENTS

| | | | | |
|---|---|---|---|---|
| 2015/0367574 | A1* | 12/2015 | Araie | B29C 64/371 425/174.4 |
| 2016/0121398 | A1 | 5/2016 | Schlick et al. | |
| 2017/0087635 | A1 | 3/2017 | Wilkes et al. | |
| 2017/0216916 | A1 | 8/2017 | Nyrhilä et al. | |
| 2018/0065303 | A1 | 3/2018 | Schade | |
| 2018/0079133 | A1 | 3/2018 | Ederer et al. | |
| 2018/0133796 | A1* | 5/2018 | Kawada | B22F 12/70 |
| 2018/0236550 | A1* | 8/2018 | Herzog | B29C 64/35 |
| 2019/0176282 | A1* | 6/2019 | Speker | B23K 26/70 |
| 2019/0322050 | A1 | 10/2019 | Connell | |
| 2020/0061653 | A1 | 2/2020 | Wakelam et al. | |
| 2020/0061656 | A1 | 2/2020 | Shalaby | |
| 2022/0009001 | A1 | 1/2022 | Schilling et al. | |
| 2023/0043535 | A1* | 2/2023 | Effernelli | B29C 64/236 |
| 2023/0311415 | A1* | 10/2023 | Schaede | B22F 12/70 264/497 |

FOREIGN PATENT DOCUMENTS

| | | | | |
|---|---|---|---|---|
| DE | 102017211657 | A1 | 1/2019 | |
| DE | 102017222645 | A1 * | 6/2019 | B33Y 10/00 |
| DE | 102018121136 | A1 | 3/2020 | |
| DE | 102018219304 | A1 | 5/2020 | |
| EP | 1137504 | B1 | 3/2003 | |
| EP | 3147047 | A1 | 3/2017 | |
| WO | WO 2019115140 | A1 | 6/2019 | |

* cited by examiner 56
55
71
62
60
35
39
38
33
X
Y
30
17
57
34
59
71
21
56
11
14

METHOD AND APPARATUS FOR PRODUCING THREE-DIMENSIONAL OBJECTS BY SELECTIVELY SOLIDIFYING A BUILD MATERIAL APPLIED LAYER BY LAYER

CROSS REFERENCE TO RELATED APPLICATIONS

This application is a continuation of International Application No. PCT/EP2021/080818 (WO 2022/096669 A1), filed on Nov. 5, 2021, and claims benefit to German Patent Application No. DE 10 2020 129 413.1, filed on Nov. 9, 2020. The aforementioned applications are hereby incorporated by reference herein.

FIELD

Embodiments of the present invention relate to a method and to an apparatus for producing three-dimensional objects by selectively solidifying a build material applied layer by layer.

BACKGROUND

DE 10 2017 211 657 A1 discloses an apparatus for additive manufacturing of a component with protective gas guiding means, and a method in this respect. This apparatus comprises a process assistance device having a centre module and a respective outer module aligned with the centre module. The centre module is triggered so as to be able to move above a build platform. The centre module comprises a coater, via which build material is fed from a powder reservoir, with the result that said build material is discharged onto the build platform during the movement of the centre module. A respective protective gas outlet device, the protective gas outlets of which are aligned towards the outer module, is provided on either side of the coater. During the solidification of the build material, a protective gas is discharged through a multiplicity of the protective gas outlets and extracted by suction by the opposite outer module. This outer module in the form of a suction extracting device can be triggered so as to be able to move synchronously with the centre module, while the build material is being solidified by means of a laser beam in the region in between.

WO 2019/115140 A1 furthermore discloses a method and an apparatus for producing three-dimensional objects by selectively solidifying a build material applied layer by layer. This apparatus comprises a receiving device, to which a centre module and, adjacent to each outer end, a respective outer module are fastened in stationary fashion. The centre module comprises a coater and a respective suction extracting device, which is aligned with the outer module. While the laser beam is being fed to a build platform between an outer module and the centre module, a process gas stream from the outer module to the suction extracting device on the centre module is generated. The opposite outer module is cut off from the feed of a process gas stream.

EP 1 137 504 B1 discloses a method and an apparatus for selective laser melting of build material to produce a three-dimensional object. A process gas stream containing argon, which is aligned horizontally and extracted by suction from an intake opening on one side of the process chamber to an outlet opening on the opposite, or left-hand, wall of the process chamber, is generated above a build platform. Feed openings for a helium process gas stream are provided above the build platform and close to a passage window for the laser beam. In a similar way to the process gas stream guided parallel to the build platform, this helium process gas stream is extracted by suction through the one outlet opening in the left-hand wall of the process chamber. The two process gas streams fed into the process chamber are extracted by suction through an outlet opening provided on the process chamber.

EP 3 147 047 A1 furthermore discloses a method and an apparatus for producing three-dimensional objects by selectively solidifying a build material applied layer by layer. In the case of this apparatus, it is provided that, by way of a shared gas supply source, a first process gas stream is fed through a right-hand wall of the process chamber, guided along above the build platform, and removed through an outlet opening on the left-hand process chamber wall. The process gas supply source feeds a second process gas stream from a flow head which is arranged above the build platform and has a multiplicity of outlet openings, through which the second gas stream is fed towards the build platform. This process gas stream introduced into the process chamber through the flow head, together with the first process gas stream, is extracted by suction through the shared opening on the left-hand wall of the process chamber.

SUMMARY

Embodiments of the present invention provide a method for producing a three-dimensional object by selectively solidifying a build material applied layer by layer. The method includes, in at least one process chamber, applying the build material layer by layer to a build platform, generating at least one beam for solidifying the build material using a radiation source, feeding the at least one beam to the build material in the build platform using at least one beam guiding element, and generating a primary gas flow along the build platform using a process assistance device. The process assistance device includes a centre module and at least one outer module aligned with the centre module, so that a section over which primary gas flows is formed between the centre module and the at least one outer module. The method further includes generating a secondary gas flow that is aligned onto and fed to the build platform using a feed device above the build platform, so that a section along which the secondary gas flows is created between the feed device and the process assistance device.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
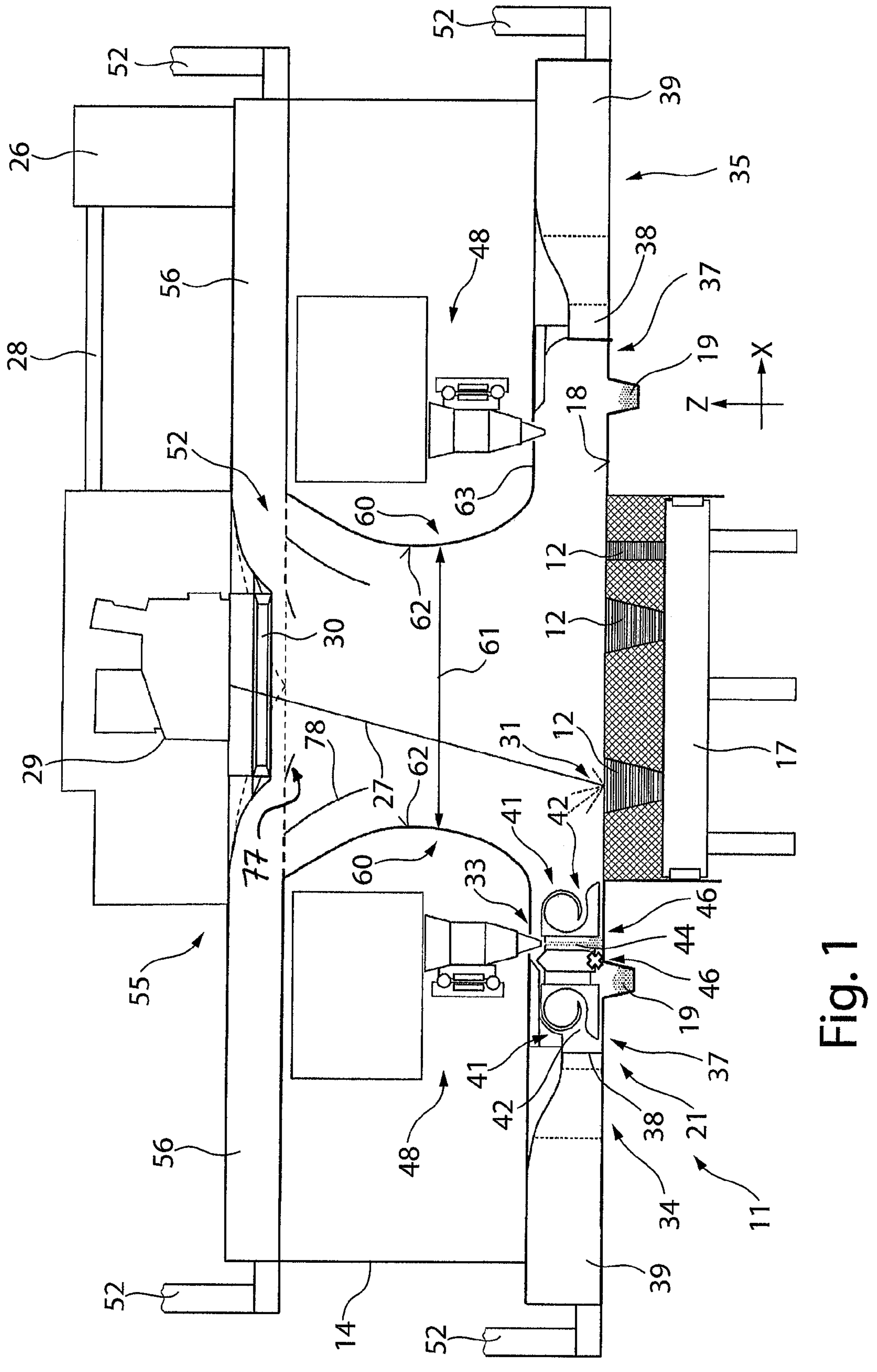
FIG. 1. shows a schematic side view of an apparatus for producing three-dimensional objects by selectively solidifying a build material applied layer by layer according to some embodiments.

Embodiments of the present invention provide a method and an apparatus for producing three-dimensional objects by selectively solidifying a build material applied layer by layer, by virtue of which the quality of the three-dimensional object and the process reliability are increased.

According to some embodiments, a method for producing three-dimensional objects by selectively solidifying a build material applied layer by layer, in the course of which method a primary gas flow is generated along the build platform by means of a process assistance device, which comprises a centre module and a respective outer module aligned with it, with the result that a section over which primary gas flows is formed between a centre module and at least one outer module, and, in addition to this primary gas flow, a secondary gas flow is introduced into the process chamber and aligned onto the build platform by means of a feed device above the build platform, and a section along which the secondary gas flows is created between the feed device and the process assistance device. This has the advantage of inducing continuous flushing of the process chamber with the secondary flow, with the result that laser-particle interaction is considerably reduced. This enables uniform process conditions, and therefore, by virtue of the combination of the primary gas stream and the secondary gas stream, an improved quality in the build of three-dimensional objects and an increase in process reliability are achieved.

Preferably, it is provided that a primary gas stream is discharged by at least one outer module and a secondary gas stream is discharged by the feed device, and that the primary gas stream and the secondary gas stream are extracted by suction together by the centre module of the process assistance device. This triggering of the centre module to extract the primary gas stream and the secondary gas stream by suction makes it possible to selectively enable solidification of the build material by the beam on either side of the centre module, wherein the centre module is moved correspondingly in relation to the build platform. In addition, improved flushing of the entire process chamber can be enabled in order to guide dirt out of the process chamber.

Advantageously, each outer module discharges a primary gas stream towards the centre module, wherein the fed primary gas stream is extracted by suction by a suction extracting means, which is aligned with each outer module and provided on the centre module. This makes it possible to enable consistent conditions during the solidification of the build material.

During a movement of the centre module above the build platform, it is preferably provided that the two suction extracting devices of the centre module are triggered to extract the primary gas stream and the secondary gas stream by suction. This enables complete extraction of the process chamber volume by suction.

Preferably, the centre module or the at least one outer module are triggered so as to be movable along the build platform. In the process, the distance between the centre module and the at least one outer module can be triggered to remain the same or vary. The centre module and the at least one outer module or the two outer modules can be directly and individually triggered to move. In this case, the outer modules may be formed with feed channels, the length of which is variable and which in particular are telescopic.

In the event of a movement of the centre module into or out of an end position adjacent to the build platform or in the event of a positioning of the centre module in the end position, preferably a constant flow of the primary jet and secondary jet is triggered. This makes it possible to optimize the process time. As an alternative, it may be provided that only that suction extracting device of the centre module that faces the build platform is triggered to extract the primary and secondary jet by suction. In particular when assuming an end position, the centre module can be filled, for example, with build material and the primary gas jet and secondary gas jet can nevertheless be extracted by suction, that is to say that, while a storage container is being filled with build material in the centre module, the build material can continue to be solidified.

Furthermore, it is preferably provided that, in the event of a movement of the centre module into or out of an end position adjacent to the build platform or in the event of a positioning of the centre module in the end position, only that outer module that is opposite and remote from the centre module is triggered to discharge the primary gas stream. This makes it possible to avoid disruptive turbulences, in particular resulting from the delivery of removed build material to overflow containers arranged adjacent to the build platform.

A further advantageous embodiment of the method provides that the two outer modules are at a standstill in a respective end position outside the build platform and the centre module is triggered to move over the build platform. This arrangement enables a more straightforward structural design of the outer modules. As an alternative, it may be provided that the centre module and the at least one outer module, preferably the two outer modules, are triggered to move along the build platform. This makes it possible to produce short paths over which flow passes between the outer module and the centre module. This has the advantage of enabling homogeneity of the section over which flow passes, as a result of which improved extraction of dirt, byproducts or the like by suction is enabled. Advantageously, it may be provided that, during the movement of the centre module and of the at least one outer module, the distance between them is kept constant. As an alternative, it is also possible to trigger a change in distance of the centre module in relation to the outer module.

Embodiments of the present invention also provide an apparatus for producing three-dimensional objects by selectively solidifying a build material applied layer by layer, which apparatus comprises a process assistance apparatus having a centre module and a respective outer module aligned with it, with the result that a section over which primary gas flows is formed between the centre module and the at least one outer module to generate a primary gas flow, and a feed device for a secondary gas flow is provided above the build platform, wherein the secondary gas flow is aligned onto the build platform from above by the feed device, and a section along which flow passes is formed between the feed device and the process assistance device. This makes it possible to build up a targeted flow of a primary gas flow and a secondary gas flow through the process chamber, in order to keep the process gas chamber free of dirt, byproducts or the like. In addition, by introducing the secondary gas flow above the build platform, it is possible to efficiently flush the process chamber, as a result of which laser-particle interaction or lengthy dwell times of particles in the process chamber are avoided.

Preferably, it is provided that the centre module has a suction extracting device, which faces the respective outer module and extends at least over the width of the build platform, that is to say in the Y direction. This suction extracting device is preferably in the form of a rotary tube with a continuous suction-extraction opening. This makes it possible for the centre module to enable extraction of the primary gas stream and/or of the secondary gas stream by suction on either side.

Preferably shaft-shaped storage containers for the build material and a coating device between them are arranged between the two suction extracting devices of the centre module of the process assistance device. As a result, a compact arrangement and structure for the centre module can be provided, with the result that at the same time discharging and coating of the discharged build material for the next layer to be solidified is made possible.

Advantageously, each outer module has an outlet nozzle, which is provided on a feed channel for the process gas. The outlet nozzle on the outer module preferably has a polynomial nozzle shape. As a result, the primary gas stream flowing out of the outlet nozzle is accelerated and stabilized, resulting in homogeneity of the process gas flow along the path over which flow passes. Advantageously, the feed channel has a variable length, in particular is telescopic. This makes it possible for the outlet nozzle to be moved above the build platform depending on the position of the centre module.

A beam inlet opening for the beam for solidifying the build material is preferably provided in the process chamber. A feed channel for feeding the secondary gas is preferably aligned on either side of the beam inlet opening. The secondary gas is preferably transferred to the process chamber through a respective feed opening adjoining the beam inlet opening or through a feed opening surrounding the beam inlet opening. This makes it possible to enable central introduction of the secondary gas stream and a uniform application of secondary gas to the process chamber.

It is preferably provided that the length of the process chamber is delimited by mutually opposite wall portions which, proceeding from the feed opening of the feed device, have a respective flow surface, the distance between which flow surfaces progressively decreases towards the build platform. This makes it possible to achieve stabilization of the secondary stream and also homogenization, in particular irrespective of the position of the process assistance device, in particular of a position of the centre module.

Advantageously, proceeding from the smallest distance between the mutually opposite wall portions, the flow surface merges into a widening, which is delimited by a horizontally aligned boundary surface, connected thereto, of the wall portion. As an alternative, the smallest distance between the flow surfaces is reached at those ends of the flow surfaces that point towards the build platform, in particular as far as a horizontally aligned boundary surface connected thereto. The horizontally aligned boundary surface is advantageously aligned above the process assistance device, which is aligned towards the process chamber floor. This makes it possible to achieve further optimization of the secondary gas stream until it impinges on the build platform or is extracted by suction by the centre module.

Preferably, the smallest distance between the flow surfaces of the wall portions of the process chamber is the same as or less, alternatively greater, than the length of the build platform. By virtue of this geometric configuration, a targeted transfer of the secondary jet to the build platform can be enabled.

According to a preferred embodiment of the process chamber, it is provided that, as seen in a side view, the wall portions of the process chamber have a tulip-shaped contour. This makes it possible to achieve a constriction of the secondary jet for flow stabilization.

An advantageous embodiment of the feed opening provides that it is formed by a throughflow element, in particular a flow screen, a perforated plate, a nonwoven or the like. As an alternative or in addition, such a throughflow element can also be provided at the feed opening which widens along the flow surface. Preferably, use can be made of a multilayer filter laminate woven fabric, for example a four-layer filter laminate woven fabric, as a result of which better performance for uniform distribution of the flow by generating a higher pressure difference is enabled. Preferably, such a filter laminate has a mesh width of 10 to 500 μm, particularly preferably 30 to 200 μm, for example 100 μm. Such a flow screen enables uniform distribution of the fed secondary gas, as a result of which the homogenization of the secondary gas stream is promoted.

An advantageous embodiment of the feed opening which widens along the flow surface provides that the throughflow element is secured on a line of the smallest distance between the flow surfaces and alternatively or additionally so as to at least partially adjoin the beam inlet opening or to partially surround it. This enables an areal homogenization of the secondary gas flow, in particular over a large surface portion which reaches from the beam inlet opening to the line of the smallest distance between the flow surfaces. In this respect, it should be noted that it is not necessary for there to be only one line of smallest distance between the flow surfaces if the two mutually opposite flow surfaces have parallel planar portions.

Preferably, the widening feed opening is completely covered by the throughflow element. As a result, the secondary gas flow passing completely through the feed opening is areally homogenized.

In the event of the process chamber having a symmetrical design, i.e. with two throughflow elements in a mirror-symmetrical arrangement, secondary gas can be fed to the process chamber in particularly turbulence-free fashion. Usually, it is also the case that fins or further throughflow elements are dispensed with.

Furthermore, it is preferably provided that the feed channels, which supply the feed opening and surround the beam inlet opening, have two baffles, which divide the fed secondary gas in the feed channel into two symmetrical lateral streams and a core stream in between them. Advantageously, in this respect it is provided that the core stream is fed to an end face of the beam inlet opening and the two lateral strands are fed to a side portion of the feed opening that surrounds the beam inlet opening. As a result, uniform filling of the process chamber with secondary gas can be enabled.

Preferably, the two baffles provided in the feed channels are arranged at a distance from one another that corresponds to the width of the beam inlet opening, with the result that the baffles extend along the width of the beam inlet opening and preferably the mutually opposite baffles arranged in the two feed channels each extend over half of the length of the beam inlet opening. This makes it possible to feed the lateral streams to the entire region of the feed opening, which extends laterally around the beam inlet opening in the form of a frame.

Furthermore, to configure the feed opening, it can alternatively be provided that the throughflow element inserted in the feed opening comprises a chamber in which a filter laminate is provided. Such a chamber makes it possible to bring the core stream and the two lateral streams together.

According to a further preferred embodiment, it is provided that an end face of the beam inlet opening has a reverse-stream fin assigned to it. This reverse-stream fin, which is provided on both sides of the beam inlet opening, brings about a horizontal reverse stream of the secondary gas, which is fed from both sides, with the result that these streams meet in the middle of the beam inlet opening and can generate a secondary gas stream directed downstream.

Furthermore, it is preferably provided that at least one flow stabilizer is provided between an end face of the beam inlet opening and the flow surface of the wall portion of the process chamber, which flow stabilizer preferably has a curvature which in particular follows the curvature of the flow surface. This enables turbulence-free feeding of the secondary gas into the process chamber in all positions of the centre module.

Further advantageous embodiments and developments of the present invention will be described and explained in more detail below on the basis of the examples illustrated in the drawings. The features that can be gathered from the description and the drawings can be used individually by themselves or as a plurality in any combination according to embodiments of the invention.

FIG. 1 illustrates a schematic side view of an apparatus 11 for producing three-dimensional objects 12 by selectively solidifying a build material applied layer by layer. These apparatuses 11 are also referred to as 3D printing systems, selective laser sintering machines, selective laser melting machines, or the like. The apparatus 11 comprises a housing 14, in which a process chamber 16 is provided. The process chamber 16 is closed towards the outside. It can be accessible via a door, which is not illustrated in more detail, or a safety closure. A build platform 17, on which at least one three-dimensional object 12 is created layer by layer, is provided in the process chamber 16. The size of the build platform 17 determines a construction field for the production of the three-dimensional objects 12. The build platform 17 can be moved vertically, or in the Z direction. Provided adjacent to the build platform 17 are overflow containers 19 or collection containers, in which non-required or non-solidified build material is gathered. A process assistance device 21 is arranged in the process chamber 16 above the build platform 17. This process assistance device 21 is triggered so as to be able to move at least partially in the X direction.

A radiation source 26, which generates a beam 27, in particular a laser beam, is assigned to the process chamber 16 or secured to the process chamber 16. This laser beam is guided along a beam guide 28 and is deflected and directed onto the build platform 17 by a triggerable beam guiding element 29. In the process, the beam 27 enters the process chamber 16 through a beam inlet opening 30. The build material applied to the build platform 17 can be solidified at the impingement point 31 of the beam 27.

The process assistance device 21 comprises a centre module 33 and a respective outer module 34, 35 assigned to the centre module 33. In the embodiment of the process assistance device 21 according to FIG. 1, it is provided that the outer modules 34, 35 are stationary in relation to a process chamber floor 18. The centre module 33 is triggered so as to be movable between a left and right end position 34, 35. In the view according to FIG. 1, the centre module 33 is positioned in the left end position 36. The outer modules 34 comprise an outlet nozzle 38, which is secured to a feed channel 39. This outlet nozzle 38 preferably has vertically aligned guide surfaces. In addition, the outlet nozzle 38 tapers in the direction of emergence. This makes it possible to homogenize and stabilize a primary gas stream fed into the process chamber 16.

The centre module 33 comprises two suction extracting devices 41, which have a respective oppositely aligned intake opening 42. A storage container 44 for receiving build material is provided between the suction extracting devices 41. This storage container 44 has at least one opening or a discharge slot pointing towards the process chamber floor 18, with the result that a layer of build material can be discharged by the centre module 33 when it is moving over the build platform 17. A coating device 46 is preferably provided between two storage containers 44 that are arranged adjacent to the suction extracting device 41. Preferably, the storage container 44 which is at the front in the direction of movement of the centre module 33 is filled with build material. The coating device 46 comes next. In particular, the coating device 46 comprises at least one coater lip.

The centre module 33 is preferably filled with build material in the right and/or left end position 36, 37. In this respect, a metering apparatus 48 can be assigned to the one end position or both end positions 36, 37.

This metering apparatus 48 can be moved along a Y axis (FIG. 2), with the result that the storage container 44 can be uniformly filled over the width of the centre module 33.

The overflow container 19 is likewise assigned to the right and the left end position 36, 37, with the result that stripped build material can be removed into the overflow container 19 by the coating device 46 of the centre module 33 when the end position 36, 37 is assumed.

Each outer module 33 is connected to a supply line 52. This supply line 52 is exposed to a primary gas by a pump or primary gas source, which is not illustrated in more detail, with the result that a primary gas flow can be discharged into the process chamber 16 by the outer modules 34.

A feed device 55 for a secondary gas flow into the process chamber 16 is provided above the process chamber 16. This feed device 55 comprises two mutually opposite feed channels 56, which are positioned adjoining the beam inlet opening 30. The secondary gas flows into the process chamber 16 and is fed from above onto the build platform 17 through at least one feed opening 57, which is assigned to or surrounds the beam inlet opening 30.

The process chamber 16 has lateral wall portions 60, which delimit the length of the process chamber 16. These wall portions 60 comprise flow surfaces 62, which extend towards the build platform 17 and constrict a cross-sectional area of the process chamber 16. This provides a distance 61 which corresponds to, or preferably is smaller than, the length of the build platform 17 that extends in the X direction, as illustrated in FIG. 1. The flow surface 62 widens from the smallest distance 61. The wall portion 60 merges into a horizontal boundary surface 63. This boundary surface 63 preferably runs parallel to the process chamber floor 18 and is provided at a distance from the process chamber floor 18, such that the process assistance device 21 can be positioned between the boundary surface 63 and the process chamber floor 18. This configuration of the process chamber 16 results in a tulip-shaped cross section or a tulip-shaped contour, as a result of which flow optimization when a secondary gas is being fed into the process chamber 16 from above is enabled. As an alternative, the process chamber 16 can have a conical contour or the contour of a parabolic inlet funnel.

Secondary gas is supplied to each feed channel 56 of the feed device 55 by way of a secondary gas source, not illustrated in more detail, through a supply line 52.

Figure 2:
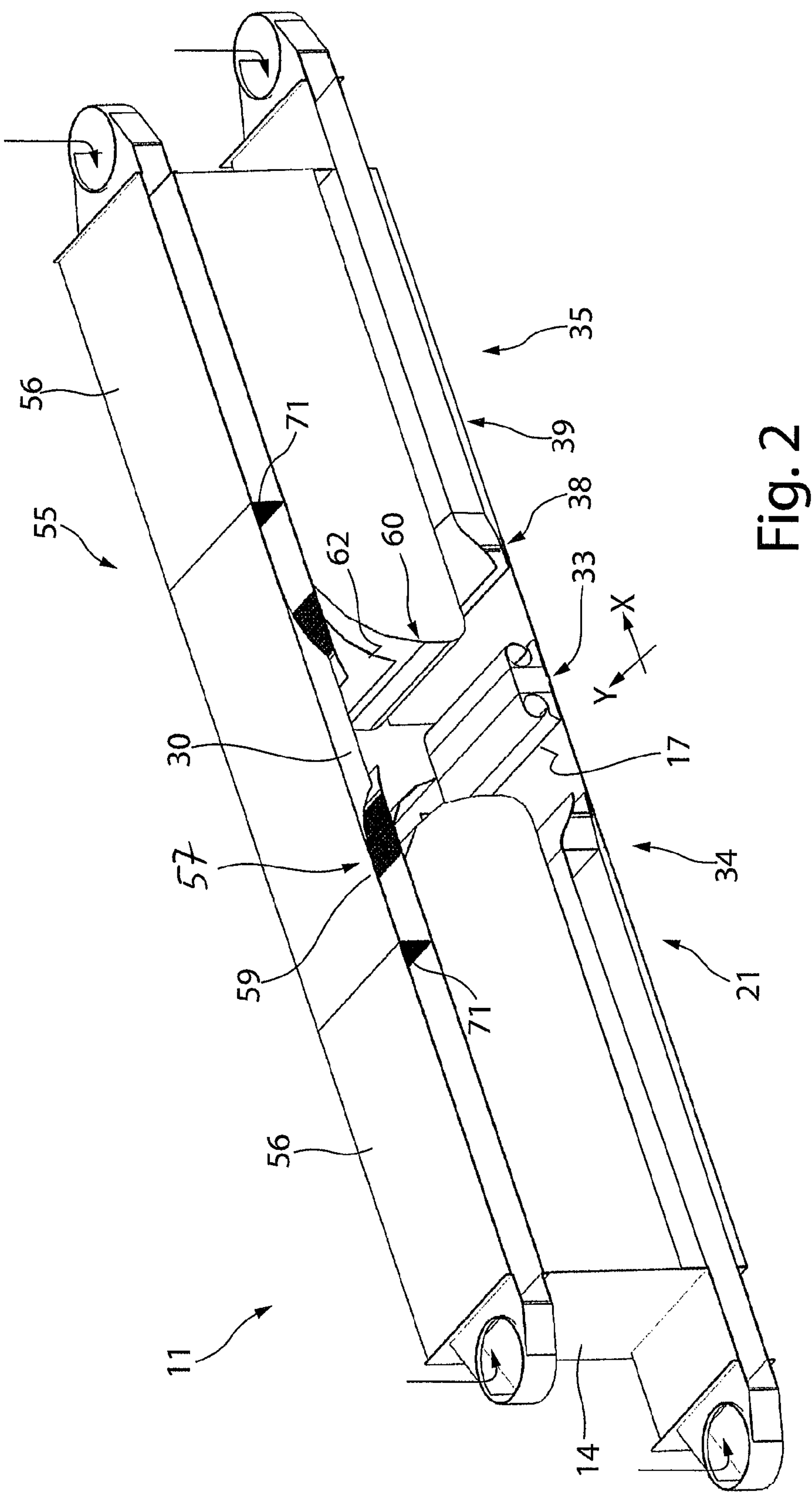
FIG. 2. shows a perspective sectional view of a process chamber according to FIG. 1.
Figures 3, 4:
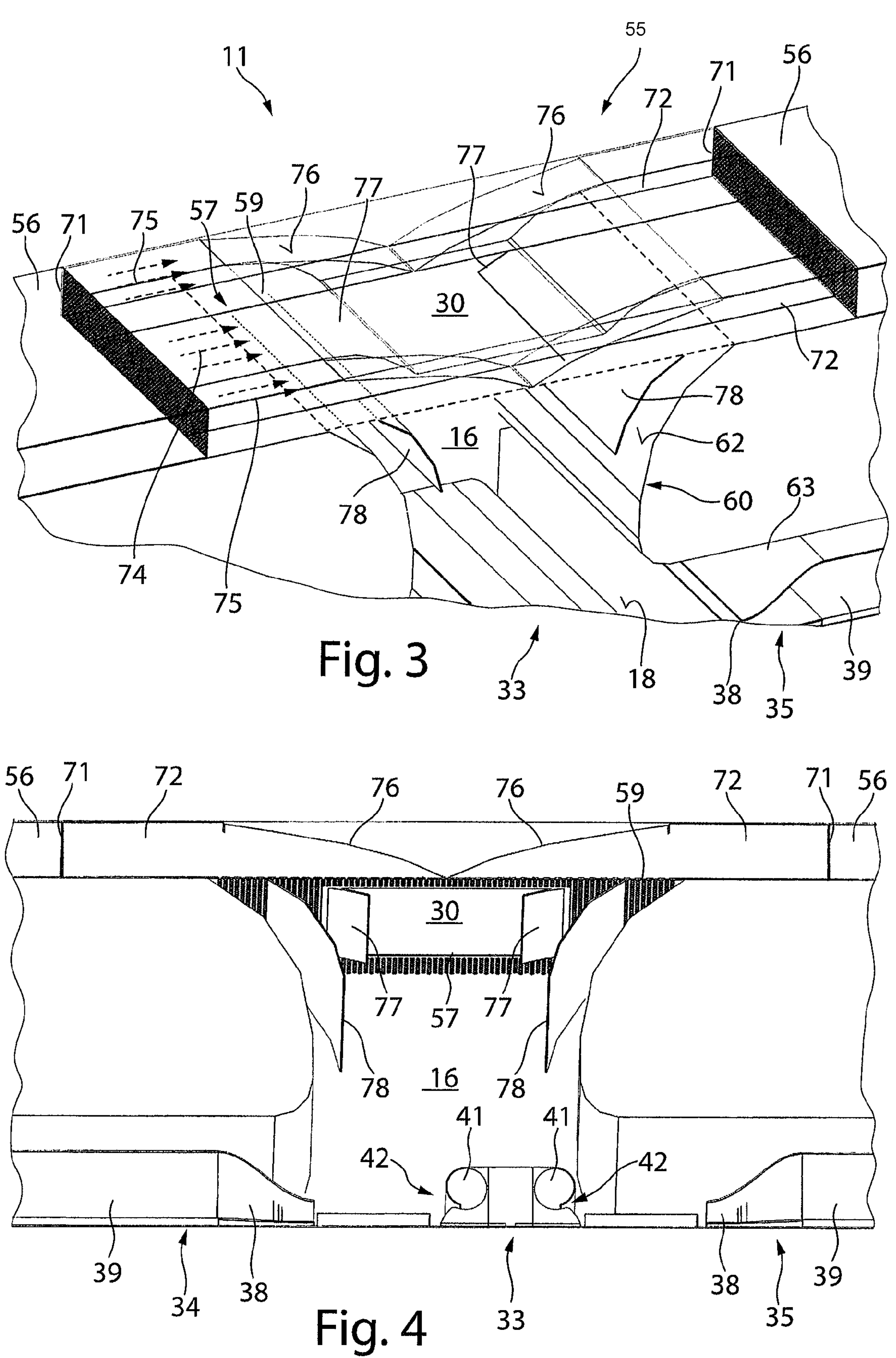
FIG. 3. shows a perspective view of a feed device for a secondary gas stream according to some embodiments.
FIG. 4. shows a schematic view, from below, of the feed device for the secondary gas stream according to some embodiments.

With reference to the following FIGS. 2 to 4, the feed device 55 for feeding a secondary gas and for forming a secondary gas stream inside the process chamber 16 will be described in more detail.

A perforated plate 71 extending over the cross section is preferably provided in the feed channel 56. As a result, it is already possible to achieve a first homogeneous division of the stream of the fed secondary gas. The feed channel 56 leads into the feed opening 57. In the exemplary embodiment, the feed opening 57 is formed by a throughflow element 59, such as a flow screen. This throughflow element 59 can, for example, also be in the form of a perforated plate or a gas-permeable knitted fabric or a multi-layer metal woven fabric or the like. The feed opening 57 completely surrounds the beam inlet opening 30. Thus, the feed opening 57 and the beam inlet opening 30 are in a common plane.

Baffles 72, which subdivide the cross section of the feed channel 56 into a core stream 74 and two external lateral streams 75, extend between the perforated plate 71 in the feed channel 56 and the feed opening 57. These baffles 72 extend along the width of the beam inlet opening 30, each over half of the length of the beam inlet opening 30. At the same time, the feed channel 56 has an upper curved surface 76, in order to feed the lateral streams 75 to the process chamber 16 via the lateral regions of the feed opening 57.

A reverse-stream fin 77 is assigned to each end face of the beam inlet opening 30 at the feed opening 57. This reverse-stream fin 77 is provided at a distance from the beam inlet opening 30 inside the process chamber 16. These reverse-stream fins 77 are aligned virtually horizontally. As a result, a horizontal reverse stream is fed through the feed channels 56 from either side, these horizontal reverse streams meeting in the middle of the beam inlet opening 30 and then creating a secondary gas stream directed downstream. A respective flow stabilizer 78 is provided between an end face of the beam inlet opening 30 and the wall portion 60. Said flow stabilizer preferably has a curvature corresponding to the flow surface 62. This flow stabilizer 78 extends over the entire width of the feed channel 56 or feed opening 57. These flow stabilizers 78 enable a reverse-stream-free and/or directed secondary gas stream in the peripheral region of the process chamber 16 irrespective of the position of the centre module 33.

Figure 5:
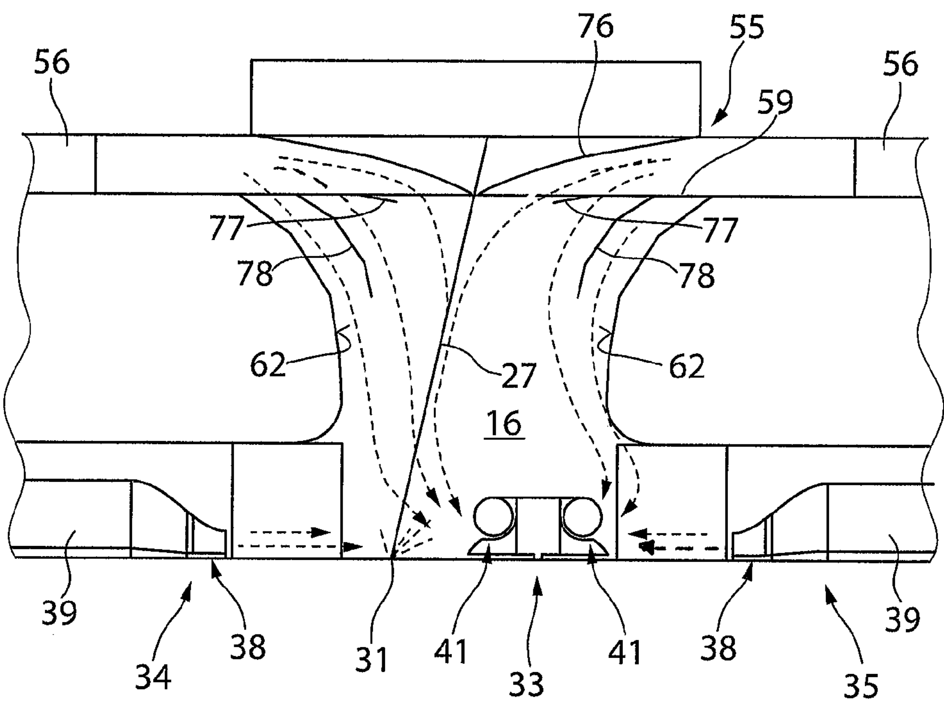
FIG. 5. shows a schematic side view of the process chamber with a primary gas stream and a secondary gas stream according to some embodiments.

FIG. 5 illustrates a schematic side view of the process chamber 16 according to FIG. 1 during a working step for producing a three-dimensional object 12. The beam 27 is directed at the build material in the build platform 17 and solidifies the build material at the impingement point 31. The centre module 33 is, for example, positioned adjacent to the impingement point 31 on the right. This centre module 33 can follow the beam 27, which is advanced for example towards the left end position 36. At the same time, the process assistance device 21 is exposed to a primary gas and the feed device 55 is exposed to a secondary gas. In the process, according to a first embodiment, it is provided that a primary gas stream is generated between a left outer module 34 and the centre module 33 and a secondary gas stream is generated between the feed device 55 and the centre module 33. In this first embodiment, only the left suction extracting device 41 of the centre module 33 is triggered for shared extraction of the primary gas stream and the secondary gas stream by suction. As an alternative, it may be provided that a primary gas stream is discharged by the left and right outer module 34, 35, which primary gas stream is extracted by suction by the respective left and right suction extracting device 41 of the centre module 33. In addition, at the same time a secondary gas stream is fed to the centre module 33 by the feed device 55. Owing to the position, illustrated in FIG. 5, of the centre module 33, an enlarged volume flow of the secondary gas is fed to the left suction extracting device 41 and extracted by suction together with the primary gas stream. A smaller volume flow of the secondary gas flow can be extracted by suction together with the right primary gas stream by the right suction extracting device 41 of the centre module 33. In this embodiment, both suction extracting devices 41 of the centre module 33 perform shared extraction by suction of the primary gas stream and secondary gas stream fed to the process chamber 16.

Preferably, it is provided that the outlet nozzle 38 of the outer modules 34, 35 has an opening cross section which is more than 3 times larger than the intake openings 42 of the suction extracting device 41.

Figure 6:
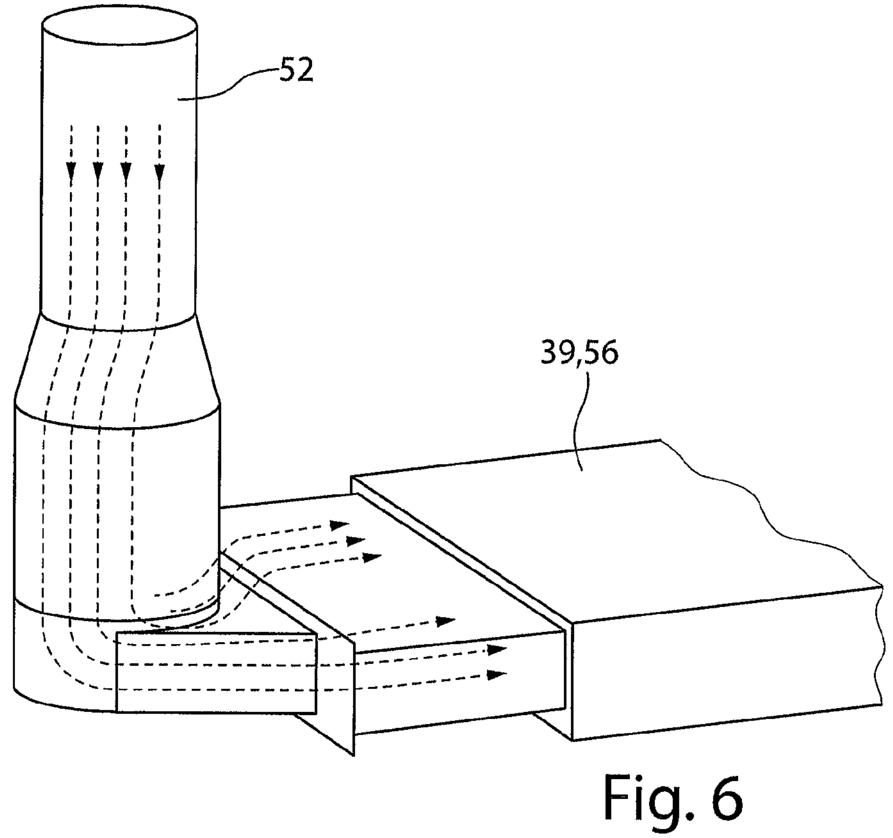
FIG. 6. shows a perspective view of a sudden-expansion diffuser for feeding a primary gas or secondary gas according to some embodiments.

FIG. 6 illustrates a perspective view of a sudden-expansion diffuser 81. This sudden-expansion diffuser 81 is formed between the supply line 52 and the feed channel 39 or 56. In this respect, it is provided that the fed process gas is deflected, for example, by 90°, and at the same time undergoes retardation of the flow owing to the enlargement of the cross section from the supply line 52 to the feed channel 39, 56. The deflection can also be effected at an angle of greater or less than 90°. This retardation is preferably effected in accordance with the Prandtl sudden-expansion diffuser principle, by having the flow, which is preferably pre-retarded, impact the baseplate of the sudden-expansion diffuser. This makes it possible to achieve a flaring of the fed process gas jet into two core streams in the feed channel 39, 56.

Figure 7:
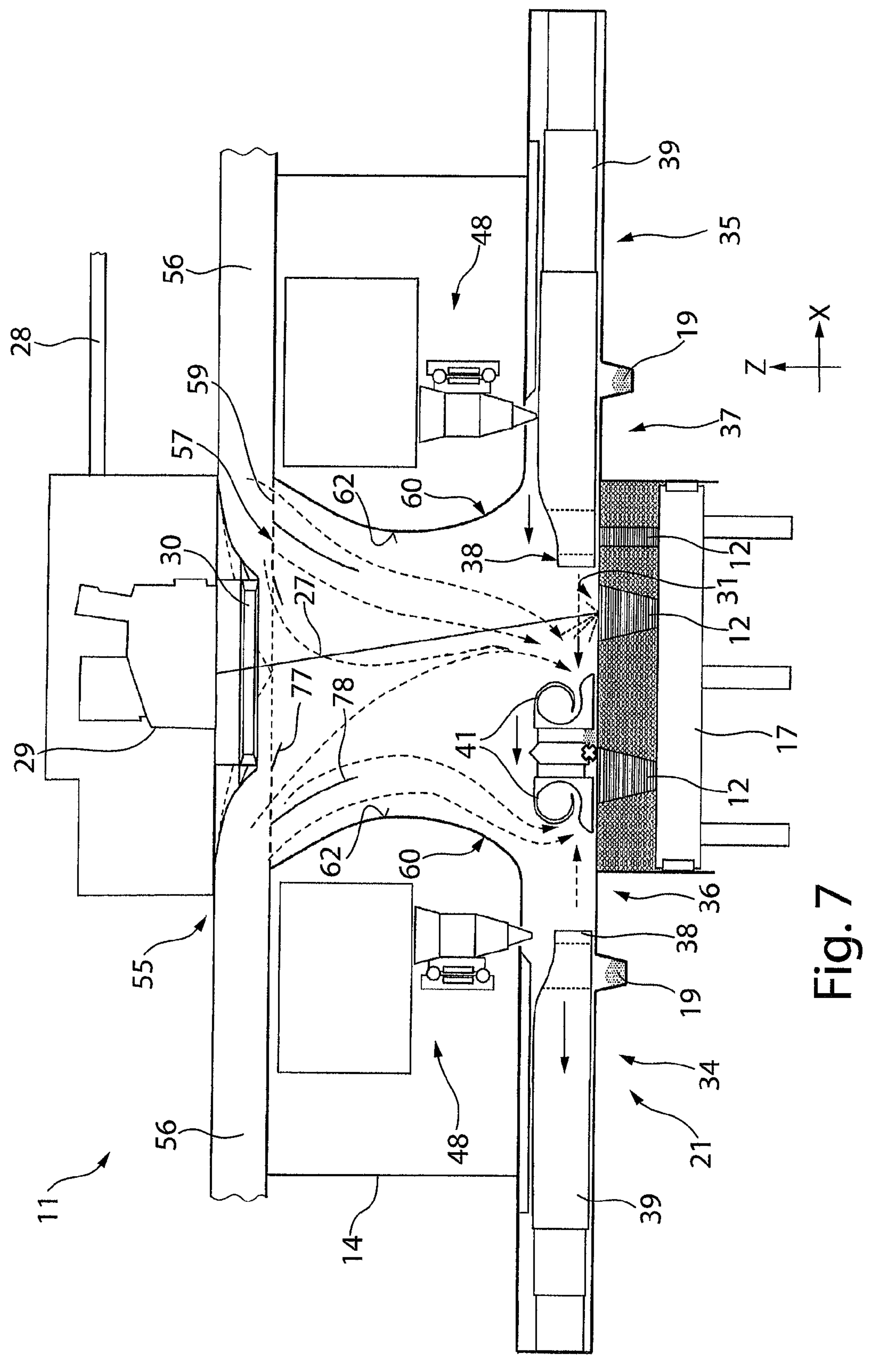
FIG. 7. shows a schematic side view of a process chamber according to an alternative embodiment to FIG. 5 while the build material is being solidified by a beam according to some embodiments.
Figure 8:
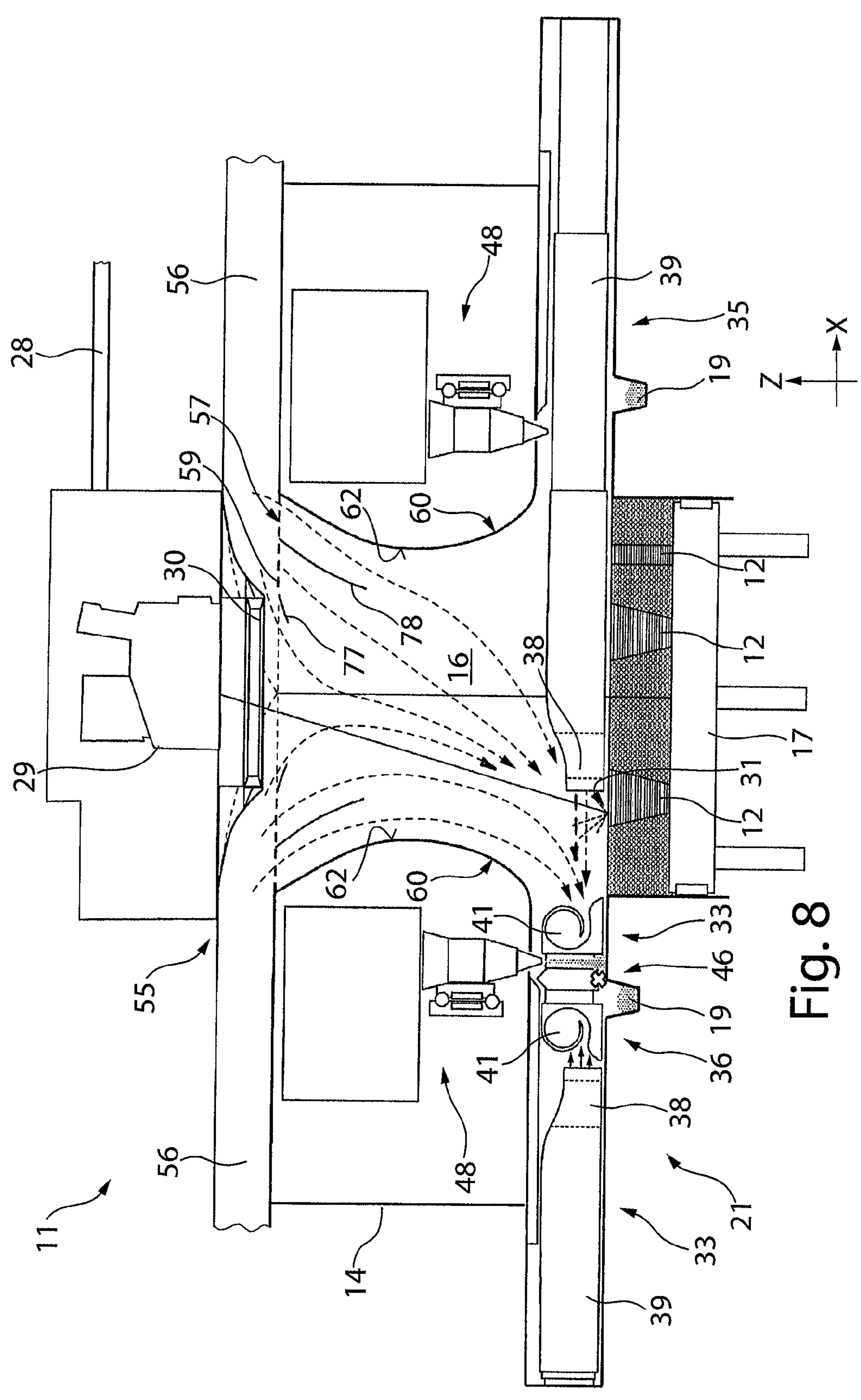
FIG. 8. shows a schematic side view of the process chamber in a further working step in relation to FIG. 7 for producing a three-dimensional object according to some embodiments.

FIG. 7 illustrates a schematic side view of a working step of the apparatus 11 for producing the three-dimensional object 12 with an alternative embodiment of the process assistance device 21. FIG. 8 shows a further possible working position according to the embodiment of FIG. 7.

In this embodiment, it is provided that the process assistance device 21 has two outer modules 34, 35 triggered so as to be able to move. In this respect, the feed channels 56 preferably have a telescopic form, with the result that the outlet nozzles 38 can be moved relative to the build platform 17. The triggering of the outer modules 34, 35 to be able to move relative to the movement of the centre module 33 has the advantage that the section over which flow passes between the outlet nozzle 38 and the suction extracting device 41 can be kept short. This makes it possible to maintain the homogeneity of the primary gas stream along the section over which flow passes, as a result of which improved extraction by suction can be achieved. In the illustration of FIG. 7, it is provided that the centre module 33 is moved into an end position 36. In the process, the right outer module 35 follows the centre module 33, preferably at a constant distance. At the same time, the left outer module 34 is progressively transferred to the left end position 36. The simultaneous feed of the primary gas streams and the secondary gas stream makes it possible to achieve complete flushing of the process chamber 16. During the movement illustrated in FIG. 7, a primary gas stream is discharged preferably by both outer modules 34, 35 and extraction by suction of the primary gas stream and secondary gas stream by the two suction extracting devices 41 of the centre module 33 is triggered.

Also while the centre module 33 is being moved into an end position 36, 37 or into the end position 36, 37, such as the left end position 36 for example, the primary gas stream and/or the secondary gas stream is maintained. Preferably, a constant flow of the entire process gas cycle is provided.

Figure 9:
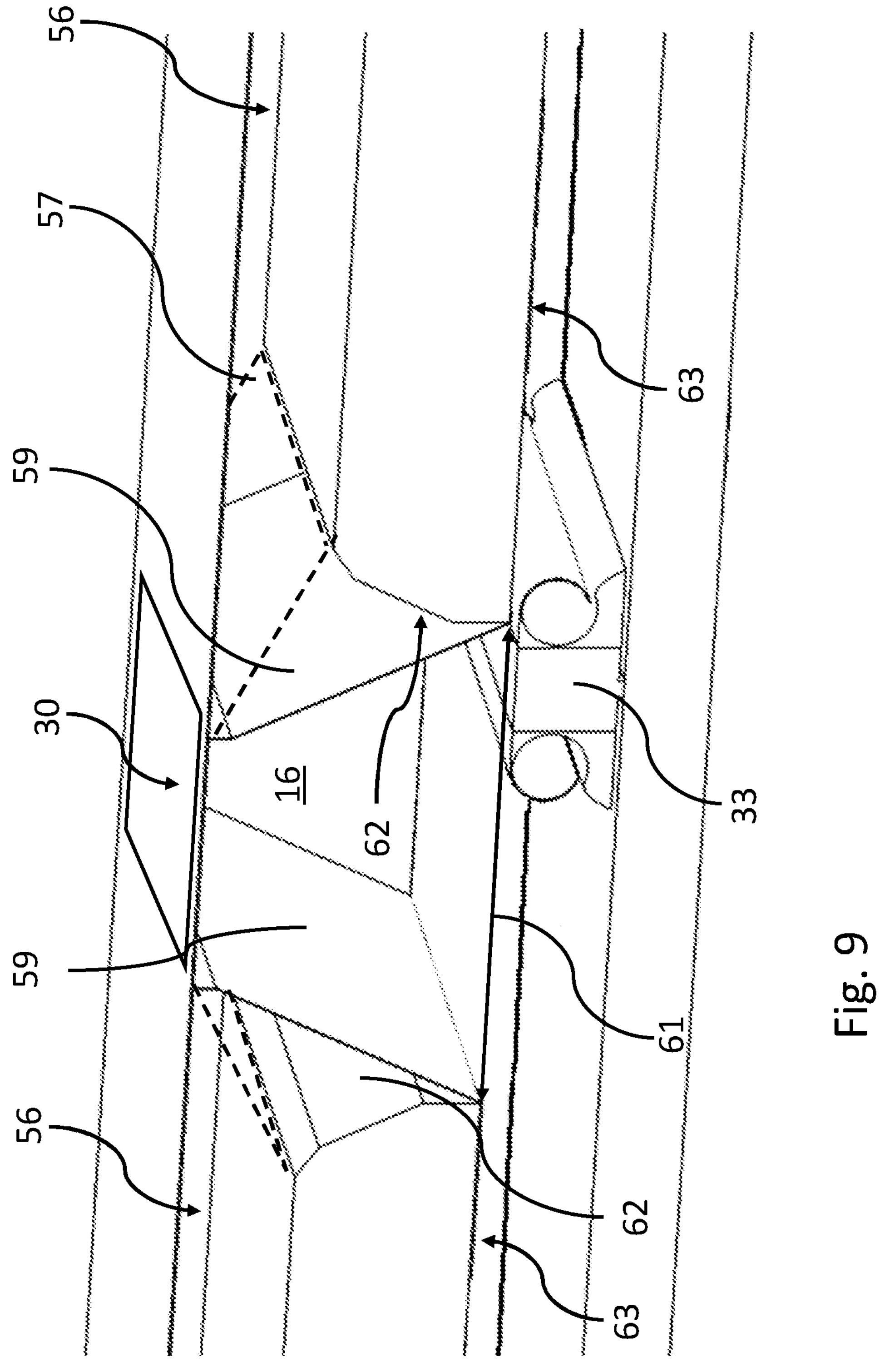
FIG. 9. shows a perspective view of a process chamber with alternative feed openings and throughflow elements according to some embodiments.

FIG. 9 illustrates an alternative configuration of the feeding of secondary gas flows into the process chamber 16. In this respect, the beam inlet opening 30 is not raised, or is less raised, and correspondingly does not project, or projects only very little, into the process chamber. As an alternative, the beam inlet opening 30 could have a form similar to the previous exemplary embodiments. As in the previously described exemplary embodiments, the secondary gas stream is fed towards the process chamber 16 through two feed channels 56. The two feed channels 56 each lead into a feed opening 57, which is delimited by the beam inlet opening 30.

A respective flow surface 62 extends from the feed opening 57 towards the centre module 33 and the build platform 17 (not illustrated). In this example, the flow surfaces 62 are each formed by three planar portions and the smallest distance 61 is formed by the lower ends of the flow surfaces 62. In this case, the smallest distance 61 is greater than the length of the build platform 17 that extends in the x direction. The smallest distance 61 could, however, also be the same as or smaller than the length of the build platform 17 that extends in the x direction. As an alternative, the flow surfaces 62 could have a form similar to the previous exemplary embodiments. A respective horizontally aligned boundary surface 63 is connected to the ends of the flow surfaces 62. The feed opening 57 through which the secondary gas flow is fed therefore widens along the flow surface 62.

In this exemplary embodiment, a throughflow element 59 is secured along the two feed openings 57 that widen in this way, in order to form particularly homogeneous secondary gas flows. In this case, the throughflow element 59 is secured to the feed opening 57, preferably adjacent to the beam inlet opening 30, and to the ends of the flow surfaces 62, i.e. along the line of the smallest distance 61 from the respective other flow surface 62, on the same side of the beam inlet opening 30. In this respect, the widening feed opening 57 is completely covered by the throughflow element 59, with the result that each secondary gas stream must pass through the throughflow element 59 and is thereby homogenized.

In this respect, the throughflow elements 59 are adjacent to the beam inlet opening 30 and vertical in relation to this beam inlet opening 30, in order as a result to create a secondary gas stream which is locally horizontal and thus parallel to the beam inlet opening. By contrast, the angle of the throughflow elements 59 along the line of the smallest distance 61 differs in each case in such a way that that side of the throughflow element 59 that is opposite to the feed channel 56 is inclined towards the centre module 33 and the build platform 17.

In this exemplary embodiment, the throughflow elements 59 are formed by two planar portions. In this case, it comprises a filter laminate, which has a mesh width between 10 and 500 μm, preferably between 30 and 200 μm, for example 100 μm.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An apparatus for producing a three-dimensional object by selectively solidifying a build material, applied layer by layer, using a beam acting on the build material, the apparatus comprising:

a process chamber comprising a build platform, arranged in an X/Y plane and on which the three-dimensional object is created, a radiation source for generating the beam, at least one beam guiding element for guiding and directing the beam onto the build material to be solidified, wherein the beam is capable of being coupled into the process chamber through a beam inlet opening of the process chamber above the build platform, a process assistance device comprising a centre module and at least one outer module, aligned with the centre module, for facilitating a primary gas flow between the at least one outer module and the centre module along a section of the build platform, and a feed device disposed above the build platform for feeding a secondary gas flow through a feed opening of the feed device onto the build platform the feed device comprising two feed channels disposed on either side of the beam inlet opening, wherein the feed opening adjoins or surrounds the beam inlet opening, wherein the process chamber comprises two wall portions opposing each other in an X direction, each wall portion having a flow surface that extends toward the build platform, wherein the flow surfaces of the two wall portions constrict a cross-sectional area of the process chamber in the X direction, and wherein proceeding from the feed opening of the feed device, a distance between the flow surfaces of the two wall portions in the X direction progressively reduces towards the build platform.

2. The apparatus according to claim 1, wherein the centre module has at least one suction extracting device, with an intake opening, which faces the at least one outer module and extends at least over a width of the build platform.

3. The apparatus according to claim 1, further comprising two storage containers for the build material and at least one coating device arranged between the two storage containers, wherein the centre module has two suction extracting devices, and wherein the two storage containers and the coating device are provided between the two suction extracting devices of the centre module.

4. The apparatus according to claim 1, wherein the at least one outer module comprises an outlet nozzle, which has a polynomial nozzle shape, a length of the outlet nozzle is variable.

5. The apparatus according to claim 1, wherein a length of the process chamber that extends in a Y direction is delimited by the two wall portions.

6. The apparatus according to claim 1, wherein the flow surface of each respective wall portion of the two wall portions extends toward the platform and merges with a horizontal boundary surface of the respective wall portion, wherein the horizontal boundary surface lies above a process chamber floor.

7. The apparatus according to claim 1, wherein a smallest distance between the flow surfaces of the two wall portions in the X direction is same as or less; than a length of the build platform that extends in the X direction.

8. The apparatus according to claim 1, further comprising a throughflow element disposed in the feed opening.

9. The apparatus according to claim 8, wherein the throughflow element of is secured along a line of a smallest distance between the flow surfaces of the two wall portions in the X direction, or at least partially adjoins or surrounds the beam inlet opening.

10. The apparatus according to claim 1, wherein each respective feed channel of the two feed channels of the feed device has a baffle, which divides the secondary gas flow in the respective feed channel into two lateral streams and a core stream in between the two lateral streams, wherein the core stream is capable of being fed to an end face of the beam inlet opening and the two lateral streams are capable of being fed to a side portions of the feed opening that laterally adjoin the beam inlet opening.

11. The apparatus according to claim 10, wherein the baffles of the two feed channels extend along a width of the beam inlet opening, and each baffle extends to half of a length of the beam inlet opening.

12. The apparatus according to claim 9, further comprising a throughflow element disposed in the feed opening, wherein the throughflow element is in a form of a chamber with a filter laminate, in which chamber the core stream and the lateral streams are brought together.

13. The apparatus according to claim 1, wherein an end face of the beam inlet opening has a reverse-stream fin assigned thereto and/or has a flow stabilizer assigned thereto between the end face of the beam inlet opening and the flow surface on a respective wall portion, and a curvature of the flow stabilizer corresponds to a curvature of the flow surface of the respective wall portion.

14. The apparatus according to claim 1, wherein the outer modules and/or the centre module of the process assistance device are capable of being moved along the build platform.

* * * * *